United States Patent
Maes

(10) Patent No.: US 7,529,853 B2
(45) Date of Patent: May 5, 2009

(54) UNIVERSAL IM AND PRESENCE AGGREGATION ON TECHNOLOGY-SPECIFIC CLIENT

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1013 days.

(21) Appl. No.: 10/850,841

(22) Filed: May 21, 2004

(65) Prior Publication Data

US 2004/0267942 A1  Dec. 30, 2004

Related U.S. Application Data

(60) Provisional application No. 60/482,513, filed on Jun. 25, 2003.

(51) Int. Cl.
*G06F 15/16* (2006.01)
(52) U.S. Cl. .................. 709/246; 709/206; 709/204
(58) Field of Classification Search .............. 709/246, 709/227, 202, 206, 228, 231, 204, 207; 713/201; 370/465, 352, 259, 466; 710/33; 455/422; 379/202.01
See application file for complete search history.

(56) References Cited

U.S. PATENT DOCUMENTS

| | | | |
|---|---|---|---|
| 5,497,373 A * | 3/1996 | Hulen et al. | 370/259 |
| 5,850,517 A | 12/1998 | Verkler et al. | |
| 6,157,941 A | 12/2000 | Verkler et al. | |
| 6,463,078 B1 * | 10/2002 | Engstrom et al. | 370/466 |
| 6,535,486 B1 * | 3/2003 | Naudus et al. | 370/235 |
| 6,549,937 B1 * | 4/2003 | Auerbach et al. | 709/206 |
| 6,629,163 B1 * | 9/2003 | Balassanian | 710/33 |
| 6,738,822 B2 * | 5/2004 | Fukasawa et al. | 709/231 |
| 2002/0087704 A1 * | 7/2002 | Chesnais et al. | 709/228 |
| 2002/0118809 A1 * | 8/2002 | Eisenberg | 379/202.01 |
| 2002/0163934 A1 * | 11/2002 | Moore et al. | 370/465 |
| 2003/0054810 A1 * | 3/2003 | Chen et al. | 455/422 |
| 2004/0015723 A1 * | 1/2004 | Pham et al. | 713/201 |
| 2006/0013205 A1 * | 1/2006 | Daniell et al. | 370/352 |

* cited by examiner

*Primary Examiner*—Le Luu
(74) *Attorney, Agent, or Firm*—Townsend and Townsend and Crew LLP

(57) ABSTRACT

A method for enabling instant message (IM) communications between a plurality of IM clients, wherein each IM client has one or more usernames associated with it, each username in the one or more usernames associated with a different IM protocol, is provided. The method comprises: receiving a message for a username in a first IM protocol associated with the username; determining an associated IM client from the received username; converting the message into a second protocol associated with the determined IM client; and sending the converted message to a second username for the determined IM client in the second protocol.

32 Claims, 5 Drawing Sheets

UNIVERSAL IM AND PRESENCE AGGREGATION ON TECHNOLOGY-SPECIFIC CLIENT

CROSS-REFERENCES TO RELATED APPLICATIONS

This application claims the benefit of the filing date of U.S. Provisional Patent Application No. 60/482513, filed Jun. 25, 2003, which is incorporated by reference in its entirety for all purposes.

BACKGROUND OF THE INVENTION

The present invention generally relates to instant message communications and more particularly to a system and method for enabling instant message communications between clients that communicate in different instant message protocols.

Instant messaging allows users to communicate in a substantially real-time manner by sending messages between instant message (IM) clients. Typically, in order for a user to send instant messages, the user must download, from an IM provider, an IM client that communicates in a specific IM protocol. Examples of IM clients include IM clients associated with providers such as America On-Line (AOL), Microsoft (MSN Messenger), ICQ, Yahoo!, Jabber, IBM (Lotus Sametime), Wireless Village, etc. Currently, many of the IM clients use different messaging protocols and only communicate with the same type of IM client. As a result, IM clients for different providers are not interoperable. For example, an AOL IM client cannot communicate with a MSN IM client, etc.

One disadvantage of the inoperability among IM clients of different providers is that a user is required to download multiple IM clients from different providers in order to communicate with all users. For example, if a first user uses Yahoo! IM and a second user uses MSN Messenger, the first user must also download and use the MSN Messenger client to communicate with the second user. Additionally, the first user is required to register a new identifier with MSN and for each newly downloaded IM client. Thus, a user will have different identifiers for each downloaded IM client. Downloading and registering multiple IM clients is not only tedious for some users but having multiple IM clients running on a computing device will degrade system performance. Accordingly, because some users do not want to download every single IM client that is available, IM communications between certain users may not be enabled. Thus, the power of instant messaging is not being fully leveraged.

One solution to the above problem of downloading and having multiple IM clients running on a computing device is downloading an aggregator IM client. These aggregators aggregate all presence information for multiple IM clients at the users' computing device and allow a user to communicate through a single IM client interface. This IM client, however, still only allows communication between IM clients from the same provider. Thus, users who use different programs cannot communicate with each other. The aggregator IM client is just an interface that displays presence information for all IM clients in a single interface and allows instant messages for all providers' IM clients to be sent from the single interface. However, users still must register with multiple IM providers and create new identifiers for each provider. Additionally, a new IM client is created in this case. Accordingly, a user cannot use the original IM client to communicate with other users; the new IM client is used instead.

Using the aggregator IM client also includes disadvantages. For example, one disadvantage of using the aggregator IM client is that, in some devices, the IM client provided on the device may be fixed or pre-selected. This is the case in some mobile devices that include pre-installed IM clients. For example, mobile devices offered by a cellular provider may only use an AOL IM client. Additionally, mobile devices typically do not allow the downloading of any other IM clients due to contractual limitations and/or technical reasons. Accordingly, the aggregator IM client cannot be used with mobile devices. Furthermore, mobile devices typically have less computing power than other larger computing devices and thus, running multiple IM clients on a mobile device may not even be feasible if allowed.

In light of the above, what is desired are methods and apparatus for improved instant messaging communications without the drawbacks described above.

BRIEF SUMMARY OF THE INVENTION

Embodiments of the present invention relate to enabling instant message communications between IM clients that use different instant message protocols.

In one embodiment, a method for enabling instant message (IM) communications between a plurality of IM clients, wherein each IM client has one or more usernames associated with it, each username in the one or more usernames associated with a different IM protocol, is provided. The method comprises: receiving a message for a username in a first IM protocol associated with the username; determining an associated IM client from the received username; converting the message into a second protocol associated with the determined IM client; and sending the converted message to a second username for the determined IM client in the second protocol.

In another embodiment, an apparatus for enabling instant message (IM) communications for a plurality of IM clients is provided. The apparatus comprises: storage for storing one or more usernames for each of the plurality of IM clients, wherein each of the plurality of usernames for an IM client is associated with a different protocol; a receiver configured to receive a message from a first IM client in the plurality of IM clients, the message sent to a first username in the one or more usernames associated with a second IM client in the plurality of IM clients; a converter configured to convert the received message from a first protocol associated with the first username to a second protocol associated with a second username; and a transmitter configured to send the converted message to the second username in the one or more usernames associated with the second IM client.

In yet another embodiment, a method for enabling instant message communications is provided. The method comprises: providing presence information for a first username associated with a first IM client that communicates in a first protocol to a second IM client, the second IM client communicating using a second username associated with a second protocol; providing presence information for a third username associated with the second IM client that communicates in the second protocol to the first IM client, the first IM client communicating using a fourth username associated with the first protocol; enabling the first IM client to communicate with the second IM client by sending a first message to the third username in the first protocol; and enabling the second IM client to communicate with the first IM client by sending a second message to the first username in the second protocol.

In another embodiment, a system for enabling instant message communications is provided. The system comprises: a first IM client that communicates in a first protocol; a second IM client that communicates in a second protocol; and a device configured to enable communications between the first IM client and the second IM client, wherein a first message from the first IM client is sent in the first protocol and received at the second IM client in the second protocol and a second message from the second IM client is sent in the second protocol and received at the first IM client in the first protocol.

In another embodiment, a method for providing IM communications at a first IM client, the first IM client communicating in a first protocol using a first identifier, is provided. The method comprises: receiving presence information for a second identifier associated with a second IM client, the second IM client communicating in a second protocol using a third identifier; receiving input intended for the second IM client; and sending the input in the first protocol to the second IM client using the second identifier, wherein the second IM client receives the input at the third identifier in the second protocol.

In another embodiment, a method for enabling instant message (IM) communications between a plurality of IM clients, the plurality of IM clients communicating in a plurality of protocols, is provided. The method comprises: determining a base username for an IM client communicating in a first protocol of the plurality of protocols; creating a username for each protocol other than the first protocol in the plurality of protocols; receiving a communication for a username in a protocol other than the first protocol; mapping the username to the base username; and sending the communication to the IM client at the base username in the first protocol.

A further understanding of the nature and the advantages of the inventions disclosed herein may be realized by reference of the remaining portions of the specification and the attached drawings.

DETAILED DESCRIPTION OF THE INVENTION

Figure 1:
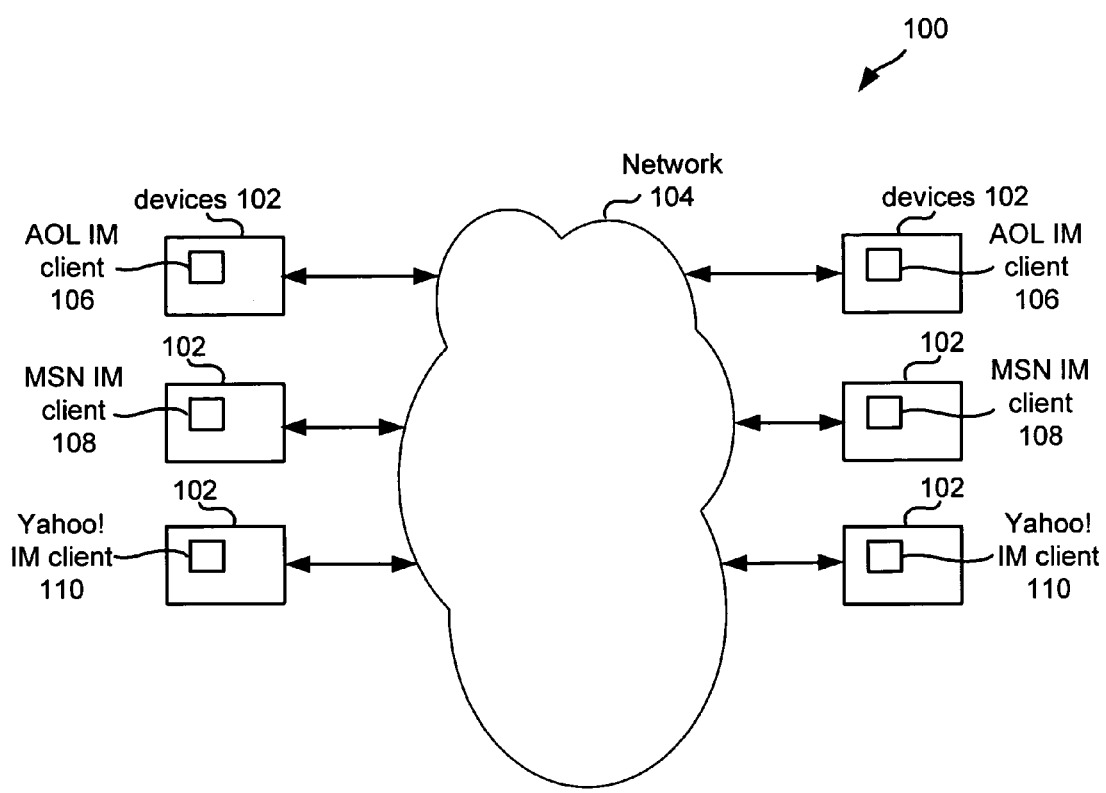
FIG. 1 illustrates a system for enabling instant message (IM) communications according to one embodiment of the present invention.

FIG. 1 illustrates a system 100 for enabling instant message (IM) communications according to one embodiment of the present invention. System 100 includes one or more devices 102 and a network 104. Devices 102 include one or more IM client programs that are used to communicate through network 104 with other IM client programs.

Instant messages are sent from IM clients to other IM clients through network 104. Network 104 may be any network that allows these communications. For example, network 104 may be the Internet, a wireless network, a wire line network, a cellular network, and the like.

Devices 102 are any devices that can invoke IM clients. For example, devices 102 include a personal computer (PC), a personal digital assistant (PDA), a pocket PC, a mobile device, a cellular phone, a smart phone, a cordless phone, or any other computing device or mobile device that can run IM client. Devices 102 may also include input devices that allow input to be sent to IM clients. For example, keypads, voice recognition capabilities, handwriting recognition pads, and the like may be included so a user may compose and input a message to an IM client.

IM clients may include any IM client that can perform instant messaging. In one embodiment, specific IM clients communicate in a protocol specific to each IM client. For example, IM clients from a provider, and as AOL, may communicate using a protocol that only AOL IM clients can use. Also, IM clients from a second provider, such as MSN, may communicate using a protocol that only MSN IM clients can use. As shown, various devices 102 include an AOL IM client 106, a MSN IM client 108, and a Yahoo! IM client 110.

IM clients provide a graphical user interface (GUI) that includes a window that records instant messages sent between IM clients and provides features such as presence information for users that are on-line, off-line, etc. A person skilled the art will appreciate many other features that may be included in IM clients. IM clients may be downloaded from different providers, such as AOL, Yahoo!, MSN, and the like. Also, IM clients may be previously downloaded and be the only IM clients available on device 102.

Although device 102 may include an IM client, before a user can communicate using the IM client, the user may have to register with the provider of IM client. For example, if AOL IM client 106 is used, the user registers with AOL. When registering, an identifier that is unique to the user is established. This identifier may be a username or anything else that identifies a user. The user then communicates with other users from the same provider through their usernames using AOL IM client 106. The other users also communicate with the user by sending instant messages to the user's username. A user may also use any downloaded AOL IM client 106 as long as the username is initialized on that IM client 106. The username also allows other users' AOL IM clients 106 to display presence information for the user's AOL IM client 106.

Devices 102 may also include multiple IM clients from different providers that communicate in different protocols. For example, a device 102 may include AOL IM client 106 and MSN IM client 108. Conventionally, an AOL IM client 106 cannot communicate directly with a MSN IM client 108. This means a username for a MSN IM client 108 cannot be addressed and sent instant messages by a user through an AOL IM client 106. In some embodiments, a device 102 may be restricted to only having a single IM client. For example, MSN IM client 108 may only be available on Microsoft smartphones, an AOL IM client 106 may be available only on a mobile device, etc.

Figure 2:
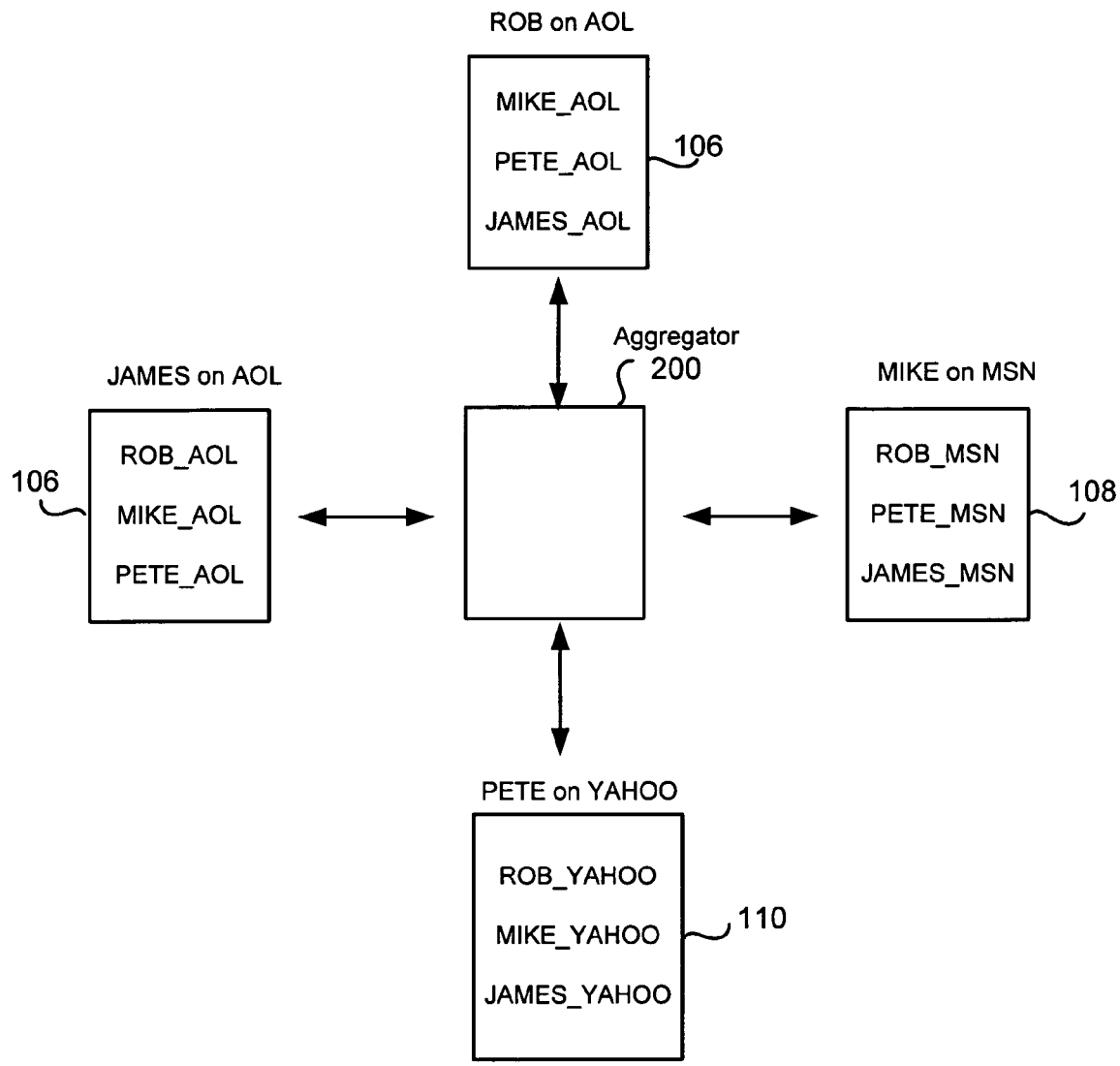
FIG. 2 illustrates a system where IM clients communicate through an aggregator according to one embodiment of the present invention.

FIG. 2 illustrates a system where IM clients communicate through an aggregator 200 according to one embodiment of the present invention. As shown, a first user, referred to as Rob, communicates through an AOL IM client 106 using a protocol specific to AOL IM clients 106, a second user, referred to as Mike, communicates through a MSN IM client 108 using a protocol that is specific to MSN IM clients 108, a third user, referred to as Pete, uses a Yahoo! IM client 110 using a protocol specific to Yahoo! IM clients 110, and a fourth user, referred to as James, communicates using an AOL IM client 106 using the AOL protocol. In one embodiment, when it is described that an IM client communicates in a protocol, it will be recognized that any IM clients that communicate in that protocol communicate through a channel. Although IM clients of different protocols may send messages over the same network 104, such as the Internet, these communications are referred to as being sent through a channel where the channel supports messages of a certain protocol. For example, AOL IM clients 106 communicate in a first channel and MSN IM clients 108 communicate in a second channel.

In order to allow communications between IM clients that communicate in different protocols, aggregator 200 maps usernames for a user to usernames in different protocols. For example, the user Rob communicates using an AOL protocol and has a username in that channel of "ROB_AOL". Thus, any AOL IM clients 106 in the AOL channel communicate with Rob by sending instant messages to the username ROB_AOL. Additionally, aggregator 200 maps the username ROB_AOL to usernames in other channels, such as MSN and Yahoo!. For example, aggregator 200 may map Rob's username to the usernames "ROB_MSN" for MSN and "ROB_YAHOO" for Yahoo!. Each user has his or her associated username mapped to the other protocols. For example, a Yahoo! user would have usernames mapped to usernames for MSN IM clients 108 and AOL IM clients 106; and a MSN user would have usernames mapped to usernames for AOL IM clients 106 and Yahoo! IM clients 110. Although the above usernames are used, it will be understood that any username may be used in the different channels as long as the username is mapped to a user in aggregator 200.

As shown in each IM client, usernames for the other IM clients are being displayed. These usernames are displayed using presence information that is propagated by aggregator 200 for each IM client. As shown, Rob will send instant messages to AOL usernames MIKE_AOL, PETE_AOL, and JAMES_AOL; Mike will send instant messages to the MSN usernames ROB_MSN, PETE_MSN, and JAMES_MSN; Pete will send instant messages to the Yahoo! usernames ROB_YAHOO, MIKE_YAHOO, and JAMES_YAHOO; and James will send instant messages to the AOL usernames ROB_AOL, MIKE_AOL, and PETE_AOL. Thus, AOL IM clients 106 send messages to AOL identifiers, MSN IM clients 108 communicate with MSN identifiers, etc.

When aggregator 200 receives a communication from an IM client, it maps the message to a user and sends the message to the user's IM client. User's can use a base IM client that receives all communications from other provider's IM clients. These communications, however, are not sent to the username associated with the base IM client but to usernames that have been created for the other provider's IM clients. For example, when Rob sends an instant message to the username, MIKE_AOL, in the AOL channel, aggregator 200 determines that the username MIKE_AOL is associated with Mike in the MSN channel and sends the instant message to the username, MIKE_MSN, in the MSN protocol. In the case where users have IM clients that communicate in the same channel, aggregator 200 does not need to map usernames between protocols. For example, if Rob desires to communicate with James, an instant message may be sent to the username, JAMES_AOL, and aggregator 200 can forward the message to the username JAMES_AOL without mapping or converting the instant message.

Aggregator 200 may also support communications other than just sending text messages from one IM client to another IM client. For example, aggregator 200 may send messages to an IM client indicating whether a user is off-line or on-line (presence information). Aggregator 200 can convert those messages and map those messages to the applicable usernames and IM clients that require presence information for the user.

Figure 3:
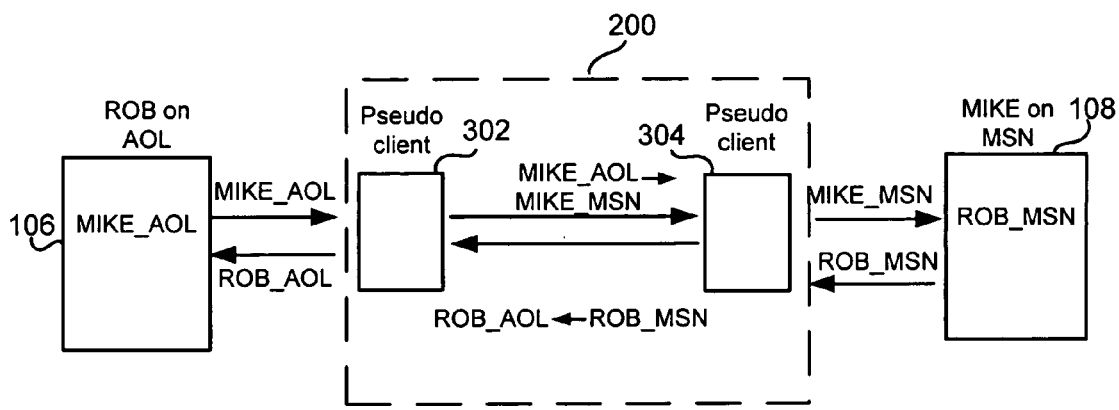
FIG. 3 illustrates an example communication between two IM clients according to one embodiment of the present invention.

FIG. 3 illustrates an example communication between two IM clients according to one embodiment of the present invention. In this example, AOL IM client 106 (Rob) that communicates in the AOL protocol is communicating with MSN IM client 108 (Mike) that communicates in the MSN protocol. As shown, a first pseudo client 302 is included in aggregator 200 to communicate with AOL IM client 106 and a second pseudo client 304 is included in aggregator 200 to communicate with MSN IM client 108.

Pseudo clients 302 and 304 are used to send and receive IM communications with IM clients. Aggregator 200 may include any number of pseudo clients. For example, pseudo client 302 may communicate with both AOL and MSN IM clients 106 and 108 instead of having pseudo client 304 communicate with AOL IM client 106. If the same pseudo client is used, the pseudo client would be able to separate the communications between AOL and MSN IM clients 106 and 108, and also be able to communicate in different protocols. Also, a single pseudo client may support communications with multiple IM clients or each IM client may be communicating with a unique pseudo client.

In the example shown, pseudo client 302 is configured to receive communications from AOL IM client 106 in the AOL protocol and pseudo client 304 is configured to receive communications from MSN IM client 108 in the MSN protocol. Because usernames are created for each user on different channels, actual messages may be sent by IM clients to the usernames in the channel of the sending IM client even though the usernames do not correspond to the receiving user's IM client. Thus, the messages to the usernames on channels other than the channel of the receiving IM client are received by pseudo client 302 and pseudo client 304. In one example, AOL IM client 106 on the AOL channel sends an IM message to the username MIKE_AOL. Pseudo client 302 is configured to receive messages for the username MIKE_AOL and acts as if it is the destination IM client for the messages. It is then determined that the username should be mapped to the username MIKE_MSN and the message is converted into the protocol associated with the username MIKE_MSN. The message is sent to pseudo client 304, which sends the converted message to the username MIKE_MSN in the MSN channel. The message is then received at MSN IM client 108. Accordingly, Rob on the AOL channel using AOL IM client 106 has effectively sent a message to Mike on the MSN channel and MSN IM client 108. A message sent by AOL IM client 106, however, was sent to a different username, MIKE_AOL, in a different channel than the username that Mike's MSN IM client 108 typically uses to receive messages in its channel.

In another example, the same process may be used for Mike on the MSN channel to send messages to Rob on the AOL channel. A message in the MSN protocol is sent by MSN IM client 108 to the username ROB_MSN. Pseudo client 304 is configured to receive messages for the username ROB_MSN and acts as if it is the destination for the messages. It is then determined that the username ROB_MSN corresponds to Rob and the username ROB_AOL. In this example, the message is converted into the AOL protocol. Pseudo client 304 sends the converted message to pseudo client 302, which then sends the converted message to Rob at the username ROB_AOL in the AOL channel. Accordingly, Mike has used his MSN IM client 108 on the MSN channel to send a message to the username ROB_MSN. The message is then mapped and converted, and sent to Rob on his AOL IM client 106 in the AOL channel. Mike, however, does not send the IM message to the username associated with Rob on the AOL channel.

Figure 4:
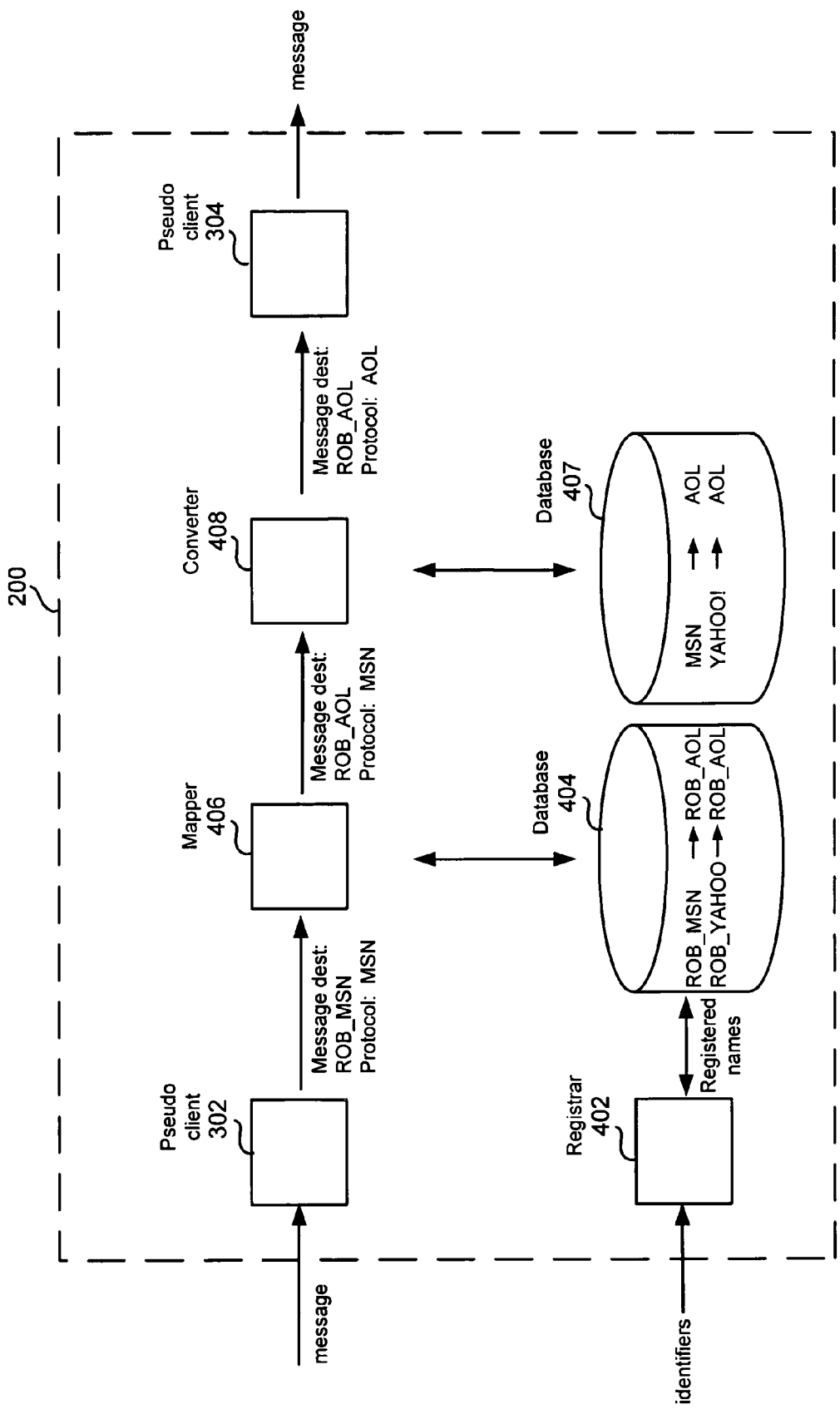
FIG. 4 illustrates an embodiment of the aggregator according to the present invention.

FIG. 4 illustrates an embodiment of aggregator 200 according to the present invention. Aggregator 200 includes a registrar 402 that receives usernames for various users and maps the usernames for each user to usernames in the applicable channels. For example, the usernames shown in FIG. 2 may be determined for all users. The names are then propagated to a database 404 that stores mappings for the usernames. For example, as shown, the username ROB_MSN maps to ROB_AOL and the username ROB_YAHOO maps to ROB_AOL. Thus, all usernames for the USER1 are associated with USER1's IM client 106 username, ROB_AOL.

When a message is received at aggregator 200, the message has been addressed to a username and is in a protocol that the originating IM client 106 communicates in. For example, as shown, a message is received at pseudo client 302 for a destination of username ROB_MSN and is in the MSN protocol. Pseudo client 302 then forwards the message to a mapper 406. Mapper 406 is configured to map the username associated with the message to a username for a user. Mapper 406 communicates with database 404 to determine the user username to send the message to. For example, in this case, ROB_MSN is mapped to Rob and the username ROB_AOL. This means that Rob communicates using the username ROB_AOL in the AOL protocol.

Once a message has been mapped to a new destination, ROB_AOL in this case, the message is sent to a converter 408. Because the message may be sent in a protocol that is different from the mapped username for Rob, the message should be converted to the protocol associated with the mapped username. It will be understood that if the message is sent in a compatible protocol, then the message would not have to be converted. However, in this case, converter 408 communicates with a database 407 that includes logic that is used to map between protocols. The original message is then translated into the protocol compatible with the mapped username, in this case, the AOL protocol. Accordingly, a message sent to the username ROB_MSN in the MSN protocol has been mapped to the username ROB_AOL in the AOL protocol.

Pseudo client 304 receives the mapped and converted message and sends the message to Rob's IM client 106 at the username ROB_AOL in the AOL protocol. Accordingly, messages sent to ROB_MSN in the MSN protocol have been converted and mapped to the username ROB_AOL in the AOL protocol. Communications between IM clients 106 of different protocols have thus been enabled. It will be understood that, although the above conversion and mapping between AOL and MSN protocols are illustrated, aggregator 200 is configured to perform mappings and conversions for all supported usernames and protocols. For example, aggregator 200 includes information to perform all mappings and conversions for the usernames and protocols illustrated in FIG. 2.

Figure 5:
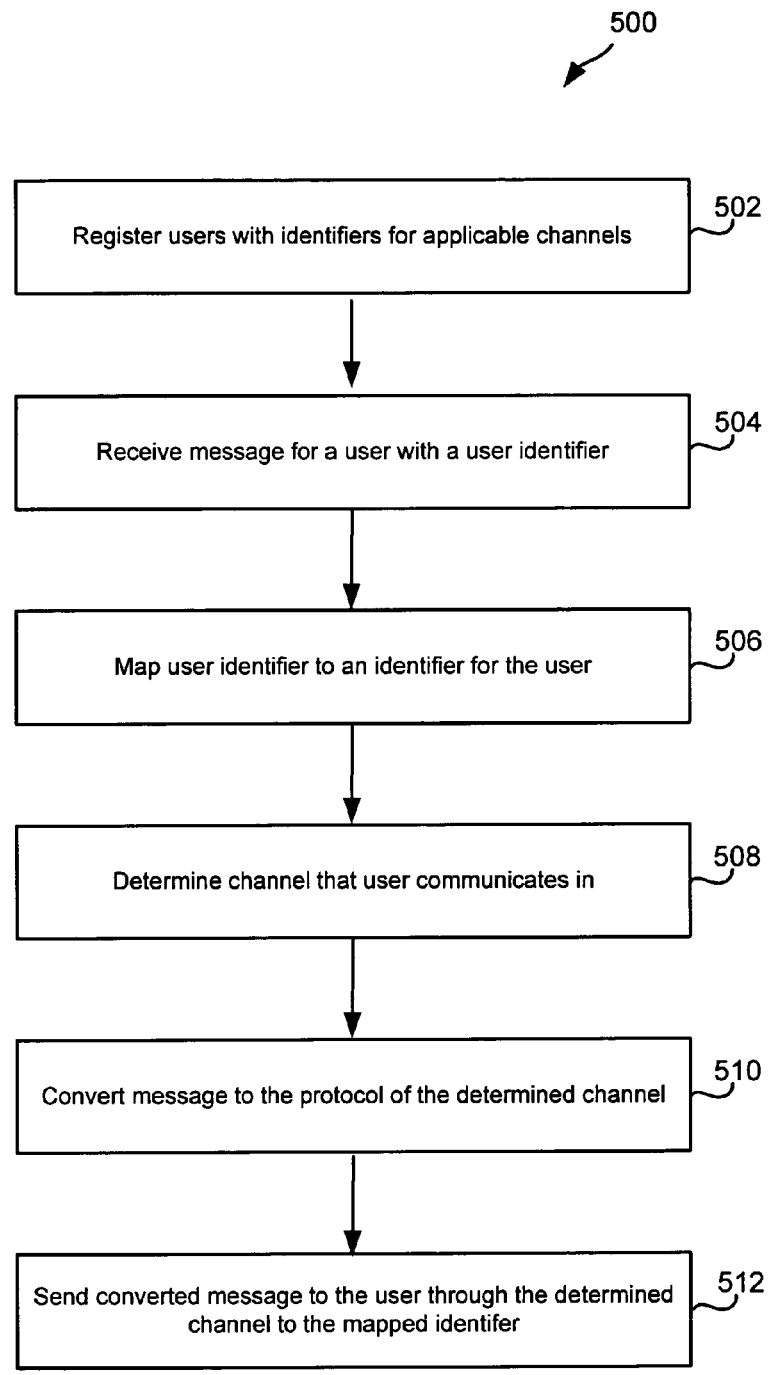
FIG. 5 illustrates a simplified flowchart of a method according to an embodiment of the present invention.

FIG. 5 illustrates a simplified flowchart 500 of a method according to an embodiment of the present invention. In step 502, aggregator 200 registers users with identifiers for applicable channels. For example, users may be registered in all channels that are supported by aggregator 200 in addition to including an identifier in the protocol that a user's IM client 106 communicates in. The created identifiers are then mapped to the user's identifier.

In step 504, a message is received for the user and addressed to a user identifier. The received message may be addressed to any identifiers that have been registered at aggregator 200. The identifier used depends on the channel that IM client communicates in. For example, if the sender is communicating through an AOL IM client 106, a message would be addressed to a user identifier in the AOL channel.

In step 506, aggregator 200 maps the identifier to another identifier in a different channel for the user. The mapping is done using a mapping that was created when the identifiers were registered with aggregator 200.

In step 508, aggregator 200 determines the channel that the user communicates in. In this case, the protocol that the user communicates in is determined.

In step 510, if necessary, aggregator 200 converts the message to the protocol of the determined channel. Thus, the message can now be sent through the channel to the IM client that the user is using.

In step 512, aggregator 200 sends the converted message to the user through the determined channel using the identifier that was mapped to the user.

Thus, aggregator 200 has enabled the user to send and receive messages that were sent from an IM client that communicates in a different protocol. Aggregator 200 maps messages sent to different usernames for different protocols to a username associated with the user's IM client and also converts the messages into a protocol associated with the user's IM client. Accordingly, additional IM clients do not need to be downloaded by a user and a user may communicate through only one IM client of a certain protocol. One advantage this affords is on devices in which a user cannot download extra IM clients or is restricted to a certain IM client, the user may communicate with other users using IM clients of a different protocol using the IM client available on the device.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An apparatus for enabling instant message (IM) communications for a plurality of IM clients, the apparatus comprising:

storage for storing a plurality of usernames for each of the plurality of IM clients, wherein each of the plurality of usernames for an IM client is associated with a different protocol;

a receiver configured to receive a message from a first IM client in the plurality of IM clients, the message sent to a first username in the plurality of usernames associated with a second IM client in the plurality of IM clients;

a converter configured to convert the received message from a first protocol associated with the first username to a second protocol associated with a second username; and a transmitter configured to send the converted message to the second username in the plurality of usernames associated with the second IM client, wherein the receiver is configured to receive a second message from the second IM client for a third username in the one or more usernames associated with the first IM client; and wherein the transmitter is configured to send the second message to a fourth username in the one or more usernames associated with the first IM client.

2. The apparatus of claim 1, further comprising:
a mapper configured to map the first username to the second IM client, wherein the first username is mapped to the second username for the second IM client.

3. The apparatus of claim 2, wherein the mapper is configured to map the third username to the first IM client, wherein the third username is mapped to the fourth username for the first IM client; and
wherein the second message is converted from the second protocol associated with the third username to the first protocol associated with the fourth username.

4. The apparatus of claim 1, further comprising a presence communicator configured to provide presence information for each of the stored plurality of usernames for each of the plurality of IM clients.

5. The apparatus of claim 1, wherein the receiver comprises a first pseudo client, wherein the first pseudo client is configured to receive the message sent to the first username; and wherein the transmitter comprises a second pseudo client, wherein the second pseudo client is configured to send the message to the second username.

6. The apparatus of claim 1, wherein at least one of the first IM client and second IM client is included on a mobile device.

7. The apparatus of claim 6, wherein a mobile device including the first IM client is configured to only support a first protocol and a mobile device including the second IM client is configured to only support a second protocol.

8. A method for enabling instant message communications, the method comprising:
providing presence information for a first username associated with a first IM client that communicates in a first protocol to a second IM client, the second IM client communicating using a second username associated with a second protocol;
providing presence information for a third username associated with the second IM client that communicates in the second protocol to the first IM client, the first IM client communicating using a fourth username associated with the first protocol;
enabling the first IM client to communicate with the second IM client by sending a first message to the third username in the first protocol; and
enabling the second IM client to communicate with the first IM client by sending a second message to the first username in the second protocol.

9. The method of claim 8, wherein enabling the first IM client to communicate with the second IM client comprises converting the first message in the first protocol to a third message in the second protocol; and
sending the third message to the fourth username in the second protocol.

10. The method of claim 8, wherein enabling the second IM client to communicate .with the first IM client comprises converting the second message in the second protocol to a third message in the first protocol; and
sending the third message to second username in the second protocol.

11. The method of claim 8, wherein enabling the first IM client to communicate with the second IM client comprises storing a mapping between the third username and the second username; and
using the mapping to determine the first message sent to the third username should be sent to the second username in the second protocol.

12. The method of claim 8, wherein enabling the second IM client to communicate with the first IM client comprises storing a mapping between the first username and the fourth username; and
using the mapping to determine the second message sent to the first username should be sent to the fourth username in the first protocol.

13. A system for enabling instant message communications, the system comprising:
a first IM client that communicates in a first protocol;
a second IM client that communicates in a second protocol; and
a device configured to enable communications between the first IM client and the second IM client, wherein a first message from the first IM client is sent in the first protocol and received at the second IM client in the second protocol and a second message from the second IM client is sent in the second protocol and received at the first IM client in the first protocol,
wherein the first IM client is associated with a first identifier in the first protocol and a second identifier in the second protocol and the second IM client is associated with a third identifier in the second protocol and a fourth identifier in the first protocol.

14. The system of claim 13, wherein the first message is sent to the fourth identifier associated with the second IM client and received at the third identifier associated with the second IM client.

15. The system of claim 13, wherein the second message is sent to the second identifier associated with the first IM client and received at the first identifier associated with the first IM client.

16. The system of claim 13, wherein the device is configured to send presence information for the second identifier to the second IM client and presence information for the fourth identifier to the first IM client.

17. A method for providing IM communications at a first IM client, the first IM client communicating in a first protocol using a first identifier, the method comprising:
receiving presence information for a second identifier associated with a second IM client, the second IM client communicating in a second protocol using a third identifier;
receiving input intended for the second IM client; and
sending the input in the first protocol to the second IM client using the second identifier, wherein the second IM client receives the input at the third identifier in the second protocol.

18. The method of claim 17, further comprising:
receiving a message in the first protocol from the second IM client at the first identifier, wherein the second IM client sent the message to a fourth identifier in the second protocol.

19. The method of claim 17, further comprising converting the communication to the first protocol.

20. The method of claim 17, further comprising:
storing the created usernames; and
using the stored usernames to map the username to the base username.

21. The method of claim 17, further comprising providing presence information for the created usernames to IM clients that communicate in the same protocol as the protocol associated with each created username.

22. A method for enabling instant message (IM) communications between a plurality of IM clients, the plurality of IM clients communicating in a plurality of protocols, the method comprising:

determining a base username for an IM client communicating in a first protocol of the plurality of protocols;

creating a username for each protocol other than the first protocol in the plurality of protocols;

receiving a communication for the username in each protocol other than the first protocol;

mapping the username in each protocol other than the first protocol to the base username; and sending the communication to the IM client at the base username in the first protocol.

23. A system for enabling instant message (IM) communications between a plurality of IM clients, wherein at least two IM clients communicate in a different protocol, the system comprising:

a first IM client that communicates in a first protocol;

a second IM client that communicates in a second protocol, wherein the second IM client sends messages in the second protocol to a first identifier associated with a first user of the first IM client and the first IM client send messages in the first protocol to a second identifier associated with a second user of the second IM client;

a device configured to enable communications between the first IM client and the second IM client, the device comprising:

a mapper configured to map messages received from the second client for the first identifier to a third identifier for the first user and map messages received from the first client for the second identifier to a fourth identifier for the second user;

a converter configured to convert messages received from the second client for the first identifier to the first protocol and convert messages received from the first client for the second identifier to the second protocol; and a transmitter configured to send the converted messages received from the second client for the first identifier to the third identifier in the first protocol and send the converted messages received from the first client for the second identifier to the fourth identifier in the second protocol.

24. A computer program product embedded in a computer readable storage medium and including instructions that, when executed by a processor, cause the processor to enable instant message communications, the computer program product comprising:

logic configured to provide presence information for a first username associated with a first IM client that communicates in a first protocol to a second IM client, the second IM client communicating using a second username associated with a second protocol;

logic configured to provide presence information for a third username associated with the second IM client that communicates in the second protocol to the first IM client, the first IM client communicating using a fourth username associated with the first protocol;

logic configured to enable the first IM client to communicate with the second IM client by sending a first message to the third username in the first protocol; and logic configured to enable the second IM client to communicate with the first IM client by sending a second message to the first username in the second protocol.

25. The computer program product of claim 24, wherein logic configured to enable the first IM client to communicate with the second IM client comprises logic configured to convert the first message in the first protocol to a third message in the second protocol; and logic configured to send the third message to fourth username in the second protocol.

26. The computer program product of claim 24, wherein logic configured to enable the second IM client to communicate with the first IM client comprises logic configured to convert the second message in the second protocol to a third message in the first protocol; and logic configured to send the third message to second username in the second protocol.

27. A computer program product embedded in a computer readable storage medium and including instructions that, when executed by a processor, cause the processor to provide IM communications at a first IM client, the first IM client communicating in a first protocol using a first identifier, the computer program product comprising:

logic configured to receive presence information for a second identifier associated with a second IM client, the second IM client communicating in a second protocol using a third identifier;

logic configured to receive input intended for the second IM client; and logic configured to send the input in the first protocol to the second IM client using the second identifier, wherein the second IM client receives the input at the third identifier in the second protocol.

28. The computer program product of claim 27, further comprising:

logic configured to receive a message in the first protocol from the second IM client at the first identifier, wherein the second IM client sent the message to a fourth identifier in the second protocol.

29. A computer program product embedded in a computer readable storage medium and including instructions that, when executed by a processor, cause the processor to enable instant message (IM) communications between a plurality of IM clients, the plurality of IM clients communicating in a plurality of protocols, the computer program product comprising:

logic configured to determine a base username for an IM client communicating in a first protocol of the plurality of protocols;

logic configured to create a username for each protocol other than the first protocol in the plurality of protocols;

logic configured to receive a communication for the username in each protocol other than the first protocol;

logic configured to map the username in each protocol other than the first protocol to the base username; and logic configured to send the communication to the IM client at the base username in the first protocol.

30. The computer program product of claim 29, further comprising logic configured to convert the communication to the first protocol.

31. The computer program product of claim 29, further comprising:

logic configured to store the created usernames; and logic configured to use the stored usernames to map the username to the base username.

32. The computer program product of claim 29, further comprising logic configured to provide presence information for the created usernames to IM clients that communicate in the same protocol as the protocol associated with each created username.

* * * * *

UNITED STATES PATENT AND TRADEMARK OFFICE
CERTIFICATE OF CORRECTION

| | | |
|---|---|---|
| PATENT NO. | : 7,529,853 B2 | Page 1 of 1 |
| APPLICATION NO. | : 10/850841 | |
| DATED | : May 5, 2009 | |
| INVENTOR(S) | : Stephane H. Maes | |

It is certified that error appears in the above-identified patent and that said Letters Patent is hereby corrected as shown below:

In column 9, line 55, in claim 10, delete ".with" and insert -- with --, therefor.

Signed and Sealed this

First Day of June, 2010

David J. Kappos
*Director of the United States Patent and Trademark Office*